(12) United States Patent
Stoica et al.

(10) Patent No.: US 11,861,175 B2
(45) Date of Patent: Jan. 2, 2024

(54) LATENCY IN DATA STORAGE SYSTEMS

(71) Applicant: International Business Machines Corporation, Armonk, NY (US)

(72) Inventors: Radu Ioan Stoica, Zurich (CH); Aaron Daniel Fry, Richmond, TX (US); Nikolas Ioannou, Zurich (CH); Nikolaos Papandreou, Thalwil (CH); Roman Alexander Pletka, Uster (CH); Charalampos Pozidis, Thalwil (CH); Jenny L Brown, Houston, TX (US)

(73) Assignee: International Business Machines Corporation, Armonk, NY (US)

(*) Notice: Subject to any disclaimer, the term of this patent is extended or adjusted under 35 U.S.C. 154(b) by 56 days.

(21) Appl. No.: 17/654,328

(22) Filed: Mar. 10, 2022

(65) Prior Publication Data

US 2023/0289061 A1 Sep. 14, 2023

(51) Int. Cl.
*G06F 3/06* (2006.01)

(52) U.S. Cl.
CPC .......... *G06F 3/0611* (2013.01); *G06F 3/0655* (2013.01); *G06F 3/0679* (2013.01)

(58) Field of Classification Search
CPC ..... G06F 3/0611; G06F 3/0655; G06F 3/0676
USPC ................. 711/154, 113, 142, 143
See application file for complete search history.

(56) References Cited

U.S. PATENT DOCUMENTS

| | | | |
|---|---|---|---|
| 9,122,503 B1 | 9/2015 | Hoff | |
| 2003/0110352 A1* | 6/2003 | Hashimoto | G06F 3/0676 711/113 |
| 2006/0168418 A1* | 7/2006 | Adusumilli | G06F 12/0855 711/E12.043 |
| 2014/0129904 A1* | 5/2014 | Sakai | H03M 13/1515 714/768 |
| 2016/0027518 A1* | 1/2016 | Zettsu | G06F 13/161 365/185.12 |
| 2018/0039425 A1 | 2/2018 | Li | |
| 2018/0189101 A1 | 7/2018 | Xu et al. | |
| 2018/0232312 A1* | 8/2018 | Kawano | G06F 11/1076 |
| 2019/0012095 A1 | 1/2019 | Volos et al. | |
| 2019/0073266 A1* | 3/2019 | Khon | G11C 7/16 |
| 2023/0035390 A1* | 2/2023 | Shani | G06F 9/467 |

FOREIGN PATENT DOCUMENTS

CN 108804035 A 11/2018

OTHER PUBLICATIONS

Maharana et al., "Reducing Latency and Improving Performance Consistency in NVMeOF," Flash Memory Summit 2016, Santa Clara, CA, 14 pgs.

(Continued)

*Primary Examiner* — Hashem Farrokh

(74) *Attorney, Agent, or Firm* — Kelsey M. Skodje

(57) ABSTRACT

A method, system, and computer program product are disclosed. The method includes receiving a write request to a system and calculating, based on operating parameters of the system, a total processing time associated with servicing the write request in the system. The method also includes determining an actual time taken to store data specified in the write request and, when the actual time is less than the total processing time, delaying sending a completion message for the write request to an I/O interface.

19 Claims, 10 Drawing Sheets

(56) References Cited

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
Wang et al., "Reinforcement Learning-Assisted Garbage Collection to Mitigate Long-Tail Latency in SSD," https://dl.acm.org/doi/10.1145/3126537, Sep. 2017, 20 pgs.
Wu et al., "Overcome the GC-Induced Performance Variability in SSD-Based RAIDs With Request Redirection," IEEE Transactions on Computer-Aided Design of Integrated Circuits and Systems, vol. 38, No. 5, May 2019, 12 pgs.

\* cited by examiner

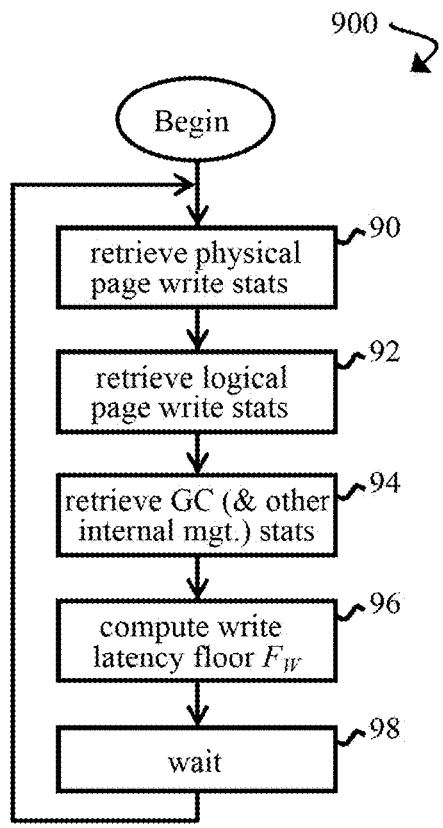
FIG. 9
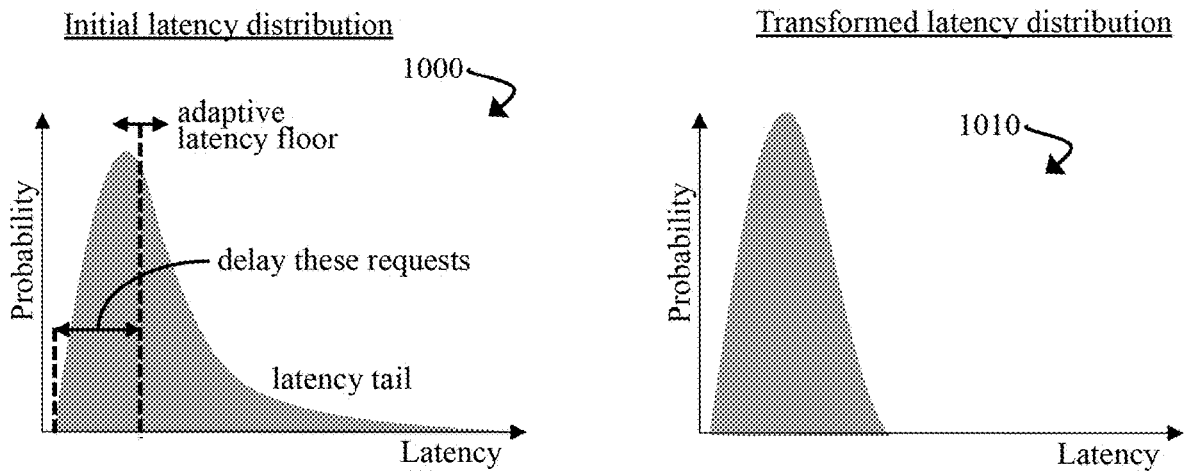
FIG. 10A
FIG. 10B

LATENCY IN DATA STORAGE SYSTEMS

BACKGROUND

The present disclosure relates to latency in data storage systems and, more specifically, to controlling latency injection in data storage systems.

Latency in data storage systems refers to the delay between input of a read or write request to the storage system and completion of the corresponding read or write operation. Latency arises for a variety of reasons due to the particular storage technology and/or overall architecture and operation of a storage system. Latency typically varies with the current operational state of a system and this, in turn, can vary based on parameters of workloads serviced by the system.

SUMMARY

Various embodiments are directed to a method, which includes receiving a write request to a system and calculating, based on operating parameters of the system, a total processing time associated with servicing the write request in the system. The method also includes determining an actual time taken to store data specified in the write request and, when the actual time is less than the total processing time, delaying sending a completion message for the write request to an I/O interface.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 9 is a flow diagram illustrating a process of monitoring system parameters stored in a controller memory, according to some embodiments of the present disclosure.

FIGS. 10A and 10B are charts illustrating latency distributions, according to some embodiments of the present disclosure.

DETAILED DESCRIPTION

Aspects of the present disclosure relate generally to latency in data storage systems and, more specifically, to controlling latency injection in data storage systems. While the present disclosure is not necessarily limited to such applications, various aspects of the disclosure may be appreciated through a discussion of various examples using this context.

Latency in data storage systems refers to the delay between input of a read or write request to the storage system and completion of the corresponding read or write operation. Latency arises for a variety of reasons due to the particular storage technology and/or overall architecture and operation of a storage system. Latency typically varies with the current operational state of a system and this, in turn, can vary based on parameters of workloads serviced by the system.

In many data storage systems, the overall processing time associated with servicing a read/write request in the system is greater than the read/write time apparent to the user. This is due to internal management processes occurring in the background which are transparent to system users. In some systems, such as solid-state drives (SSDs), background processing is required for internal maintenance of the system storage. For example, flash-based SSDs perform various background processes, such as garbage-collection, wear-levelling, error-checking and recalibration, for maintenance of the flash memory. These internal maintenance processes require data to be relocated within the flash storage and lead to so-called "write amplification" whereby the total number of internal I/O (input/output) operations is amplified in comparison with the number of write requests received by the system. Stored data may also be copied to multiple storage locations (e.g., multiple nodes of a distributed storage system) to add redundancy and provide resilience against localized system failures. Many storage systems also cache write data for destaging from the cache to underlying storage, and a write-completion message is sent to the user when the data has been cached. The latency apparent to system users is thus less than the true processing time in such systems. As a result, background processes can build up to the point where user I/O rates are not sustainable. User I/Os must then be throttled to allow background processes to catch up. In current SSDs, for example, when resource usage levels (e.g., cache utilization and RTU (Ready-to-Use flash block) levels) reach critical thresholds, all read/write requests are delayed before processing to allow background processes to catch up.

Figure 1:
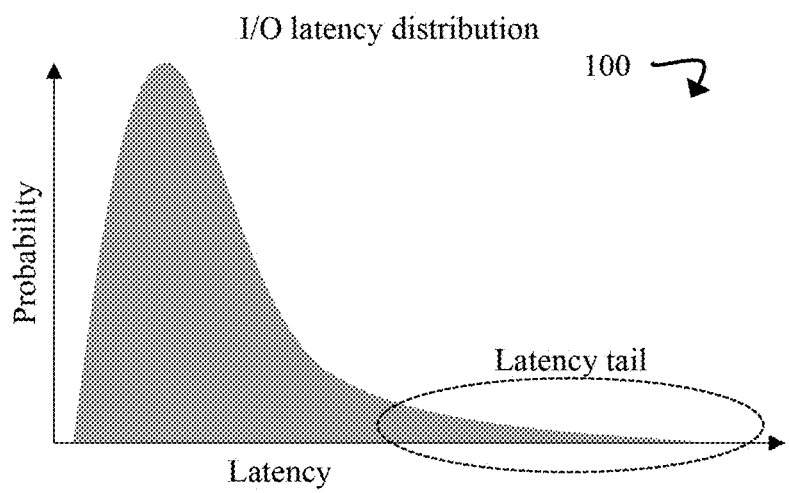
FIG. 1 is a chart illustrating a typical SSD latency distribution.

For the reasons explained above, latency can vary for individual read/write requests based on current operating parameters of a storage system, with some requests being delayed significantly more than others. SSDs, for example, typically have low average latency but also exhibit high tail latencies. FIG. 1 of the accompanying drawings shows a typical SSD latency distribution, where the long latency tail is due to those I/Os which take much longer than average to complete. These long tail latencies can also result in bandwidth fluctuations over longer periods of time.

Embodiments of the present disclosure may improve techniques for managing latency in data storage systems. These techniques can include controlling read/write operations in a data storage system. An I/O interface can receive read and write requests to the system, and an I/O controller can control retrieval and storage of data in the system in response to read and write requests. The I/O controller can send completion messages, confirming storage of data specified in write requests, to the I/O interface. For each of at least some write requests to the system, the I/O controller can calculate, based on operating parameters of the system, a total processing time associated with servicing the write request in the system and determine an actual time taken to store data specified in the write request. If this actual time is less than the total calculated processing time, the controller can delay sending the completion message for the write request.

Embodiments of this disclosure can inject latency by delaying completion messages for write requests which complete faster than the total calculated processing time for servicing those requests in the system. The total processing time calculated for a write request can accommodate background processing time based on relevant operating parameters of the system, such as average write times (e.g., average flash page write times), write amplification levels where background processes require additional data writes for redundancy and/or internal maintenance purposes, and cache destaging times in systems where write data is cached.

Latency is injected after a write request completes, rather than before the request is admitted for processing, based on whether the write completed faster than the total processing time associated with that particular request. This creates opportunities to perform outstanding background activities without increasing the latency tail. Delaying write completion messages reduces the rate at which new user I/Os are generated, and as long as there is background work to perform while I/Os are delayed, the throughput and average latency of the system are not affected. This can provide smoother throughput, injecting latency more gradually by detecting when the workload is not sustainable, and also tighten the latency distribution by injecting latency into write operations that complete fastest. Tail latencies can thus be significantly reduced without affecting overall system throughput.

The I/O controller can be adapted to delay sending a completion message by a time $\tau$ dependent on the difference $\delta$ between the total processing time calculated for a write request and the actual time for storing the write data, such that $\tau$ is greater for larger $\delta$. The amount of latency injected is thus adapted to individual requests, with requests that complete fastest being delayed the most while those which take longer to complete are penalized less, or not at all.

In some embodiments, latency may be injected for all write requests which complete faster than their calculated total processing time. However, the I/O controller can be selectively operable in one of two modes. In the first mode, completion messages for write requests are not delayed. In the second mode, the completion message for a write request is delayed if its actual completion time is less than the total processing time calculated for that request. Here, the controller monitors resource usage in the storage system, such as cache utilization levels and/or amount of free storage (e.g., RTU levels in flash-based systems) as appropriate, and switches from the first to the second operating mode if resource usage satisfies a threshold condition. This allows latency injection to be switched on and off dynamically as required based on resource availability in the system.

In some embodiments, latency injection can be tailored according to operating parameters associated with particular storage regions (e.g., storage partitions or volumes assigned to different workloads). Operating parameters can be defined for each of a plurality of storage regions in the system, and the controller is then adapted to calculate the total processing time associated with servicing a write request based on the operating parameters for a storage region used for storing data specified in that write request. Different storage regions here may be defined by logical or physical address ranges as appropriate in a given system.

Since the cost of data writes, in terms of processing overhead, is typically far greater than that for read operations, injecting latency after completion of write requests alone is highly effective in reducing tail latencies. However, some embodiments of the present disclosure may apply similar latency injection techniques to read operations, in particular for NAND flash-based storage systems in which data is periodically re-read in the background within the storage for internal management purposes, such as error-checking, threshold voltage recalibration, data refresh and so on. The I/O controller may thus be further adapted, for each of at least some read requests, to calculate a total processing time associated with servicing the read request based on operating parameters of the system, and to determine an actual time taken to read data specified in the read request. If that actual read time is less than the total processing time for the read request, the controller can then delay sending the read data to the I/O interface. Here, the controller can calculate the total processing time associated with servicing the read request to include time taken to re-read data units corresponding to the read request in the storage. Similar techniques can be applied here to those for write requests described above. For example, read latency can be adaptive—depending on the difference between the actual and calculated processing cost—and can be implemented dynamically based on resource usage levels.

Embodiments of this disclosure may improve fairness by discriminating between read and write components of the workload and by injecting latency in proportion to the true cost of user I/Os. In some embodiments, latency can be injected in a way that aims to equalize the latency of the I/O requests.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 is a chart 100 illustrating a typical SSD latency distribution. In this distribution, the long latency tail can be due to those I/Os which take much longer than average to complete. These long tail latencies can also result in bandwidth fluctuations over longer periods of time.

Figure 2:
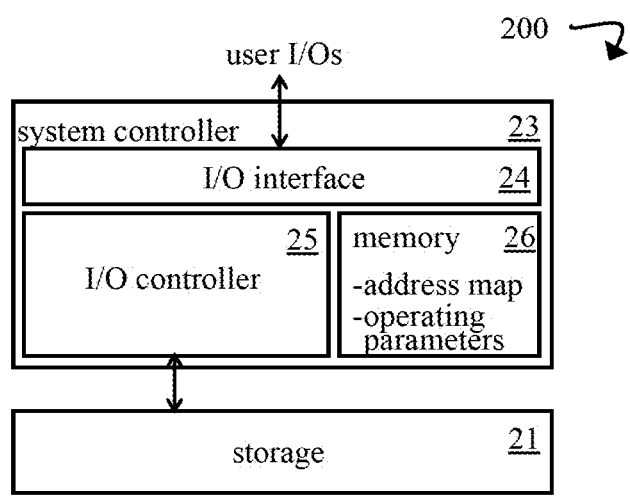
FIG. 2 is a block diagram illustrating a system for latency injection, according to some embodiments of the present disclosure.

FIG. 2 is a block diagram illustrating a system 200 for latency injection, according to some embodiments of the present disclosure. The system 200 includes storage 21 (which may include one or more storage media) and control components, represented here by system controller 23. The components of system controller 23 can handle user I/Os associated with read and write requests from system users. The system controller 23 can include an I/O interface 24 for receiving read and write requests to the system and an I/O controller 25 for controlling retrieval and storage of data in storage 21 in response to the read and write requests. For a read request arriving at the I/O interface 24, the I/O controller 25 retrieves the requested data from storage 21 and returns the read data to the user via I/O interface 24. For a write request, the I/O controller 25 stores the data specified in the request in system storage 21 and then sends a completion message, confirming storage of the specified data, to the I/O interface 24 for return to the user.

System controller 23 includes memory 26 for storing various system metadata used by I/O controller 25. This metadata includes some form of address map recording locations of user data in storage 21, such as an LBA/PBA (Logical Block Address to Physical Block Address) map that can map logical addresses used by system users to physical addresses in the storage 21. The system metadata can also include various operating parameters/metrics of the storage system 200 These operating parameters may comprise fixed and/or variable parameters (depending on the particular type and architecture of system 200 as described below) and are used by I/O controller 25 in performing a latency injection process for write operations in the system. This latency injection process may be applied to some or all write requests received by the system, as explained below.

In general, the storage 21 may comprise one or more storage components and may comprise one or more types of memory/storage technology, including cache memory, solid-state storage such as NAND flash memory, resistive memory technology such as PCM (Phase Change Memory), HDDs (hard disk drives), tape storage, and so on. Storage 21 may, for instance, include tiered or distributed storage having multiple storage devices of one or more types. In some embodiments, storage 21 includes a cache memory for temporary storage of data, along with underlying main storage which may itself include multiple storage components of one or more types. The controller memory 26 may be provided separately from system storage 21 or may be implemented within this storage 21. For example, memory 26 may be implemented by a volatile cache memory (e.g., DRAM (Dynamic Random Access Memory), SDRAM (Synchronous DRAM), or FCRAM (Fast-Cycle DRAM)) from which stored data is backed-up to underlying, non-volatile storage on power-down of the system.

I/O controller 25 may include control logic which is implemented in hardware, software, or a combination thereof. For example, functionality of controller 25 may be implemented by software, including one or more program modules, which configure one or more processors of system controller 23 to perform operations described herein. In some embodiments, hardware implementations (e.g., in hard-wired logic and/or programmable logic circuits such as FPGAs (Field-Programmable Gate Arrays)) can be employed for functionality of controller 25, and suitable implementations will be apparent to those skilled in the art from the description of operations herein.

While FIG. 2 shows components involved at operation of the storage system 200, system 200 may include various other components such as additional interfaces (e.g., between I/O controller 25 and one or more storage components of the system 200), one or more buffers for buffering of read/write data, and logic modules implementing functionality such as data compression, ECC (Error-Correction Code) processing, and so on. Depending on particular architecture of the storage system, functionality of the I/O controller 25 may be implemented by one or more logic modules which may be integrated with system storage 21 or provided separately therefrom. For example, functionality of I/O controller 25 may be implemented, in whole or in part, by a high-level controller for multiple storage devices (e.g., in a tiered or RAID (Redundant Array of Independent Devices)-type storage system). Particular functionality may also be implemented by one or more control modules which are integrated with system storage (e.g., embedded/on-chip controllers for local control of individual storage components).

Figure 3:
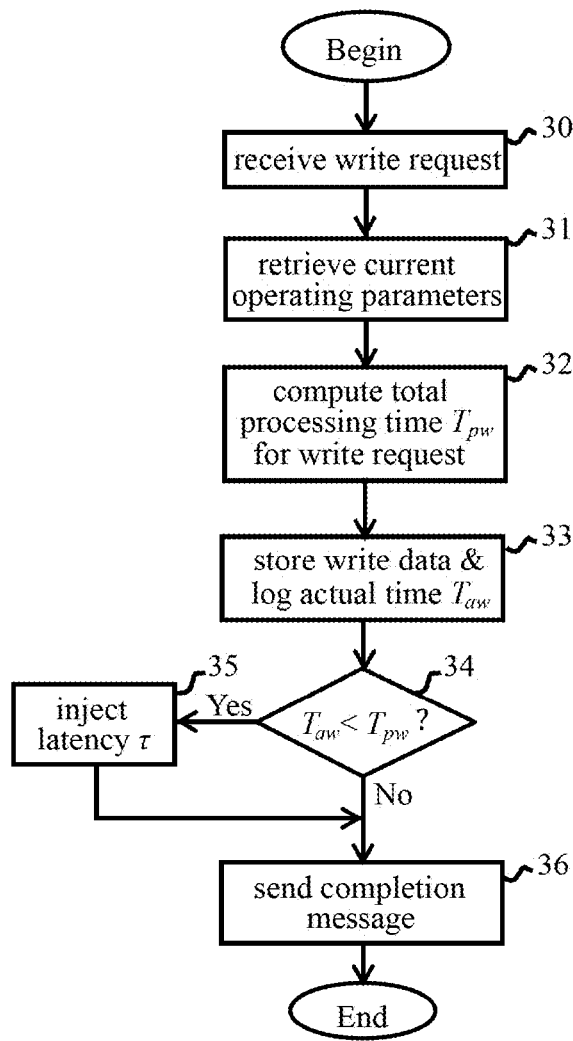
FIG. 3 is a flow diagram illustrating a latency injection process that can be performed in the system of FIG. 2 for a write request, according to some embodiments of the present disclosure.

FIG. 3 is a flow diagram illustrating a latency injection process 300 that can be performed in system 200 for a write request, according to some embodiments of the present disclosure. Operation 30 represents receipt of the write request by I/O interface 24. At operation 31, I/O controller 25 can retrieve the (current) system operating parameters from controller memory 26. At operation 32, the I/O controller 25 can calculate, based on the operating parameters retrieved at operation 31, a total processing time (denoted here by $T_{pw}$) for the write request. This time $T_{pw}$ is an estimation of the total processing time associated with servicing the write request in storage system 200. The time $T_{pw}$ thus depends on parameters of that particular write request (e.g., file size and potentially other parameters discussed below) and accounts for time associated with processes occurring in the background, as described in more detail below. As indicated at operation 33, the data specified in the write request is stored in system storage 21, and the I/O controller 25 determines the actual time, denoted by $T_{aw}$, taken to store the write data. In decision operation 34, controller 25 determines whether this actual time $T_{aw}$ is less than the total processing time $T_{pw}$ calculated at operation 32 for the write request. If so, then at operation 35 the controller 25 injects latency τ before sending the completion message for the write request to I/O interface 24 at operation 36.

The completion message for the write request is thus delayed by a time τ. If $T_{aw} \geq T_{pw}$ at decision operation 34, then no latency is injected, and the write completion message is sent immediately at operation 36. Calculation of the total processing time $T_{pw}$ at operation 32 of FIG. 3 can depend on the architecture and storage technology in system 200. The principles here are illustrated schematically in FIGS. 4 through 6 for three example scenarios.

Figure 4:
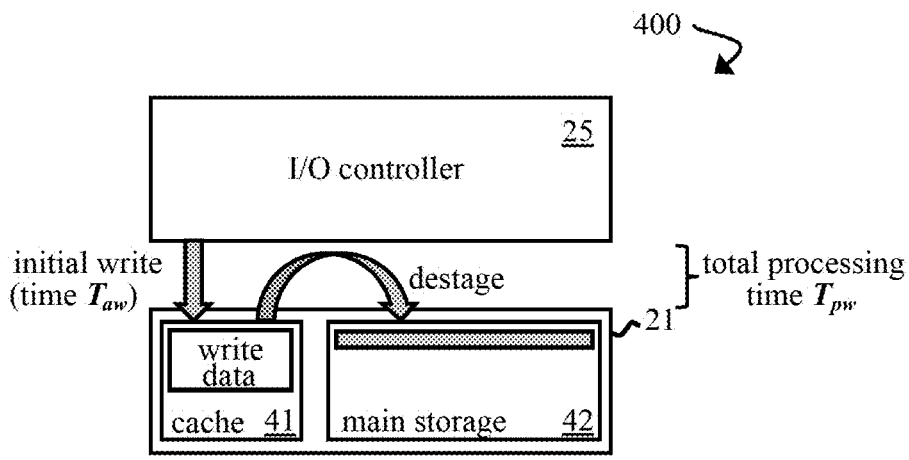
FIG. 4 is a schematic diagram illustrating a system in which system storage includes a non-volatile cache and a main storage, according to some embodiments of the present disclosure.

FIG. 4 is a schematic diagram illustrating a system 400 in which system storage 21 includes a non-volatile cache 41 and a main storage 42, according to some embodiments of the present disclosure. The I/O controller 25 of this system 400 is adapted to store data specified in a write request in the cache 41 for destaging to main storage 42. In this scenario, the actual time $T_{aw}$ taken to store data (operation 33 of FIG. 3) can include the time taken to store that data in the cache

41. This initial data write can be performed very quickly, typically in a few microseconds. However, destaging of this data to main storage 42 may take orders of magnitude longer. Here, therefore, the total processing time $T_{pw}$ associated with servicing the write request can include at least the time taken to destage data to the main storage 42 for that write request. $T_{pw}$ may also include the initial write time $T_{aw}$, if not deemed negligible in comparison with destaging time in the system, and may further account for any additional background processing performed in the main storage 42.

Figure 5:
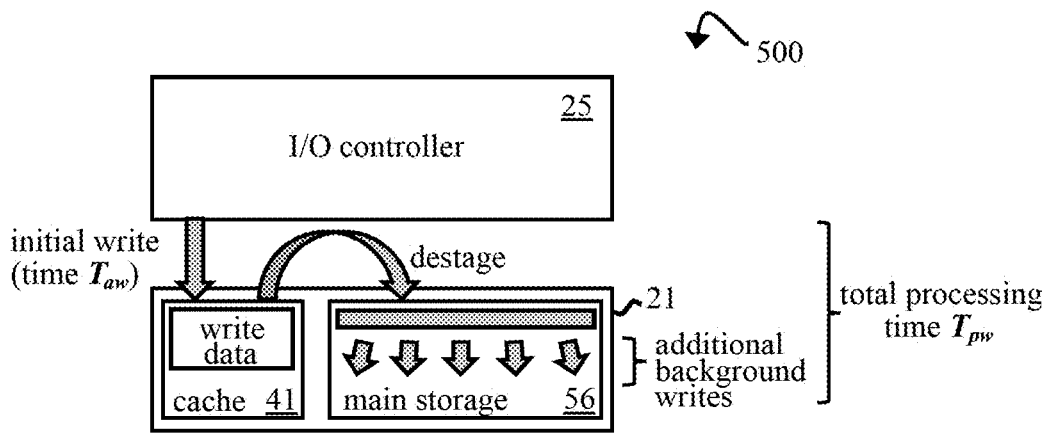
FIG. 5 is a schematic diagram illustrating a system in which there is additional background processing in a main storage, according to some embodiments of the present disclosure.

FIG. 5 is a schematic diagram illustrating a system 500 in which there is additional background processing in a main storage, according to some embodiments of the present disclosure. Here, data units are re-written within a main storage 56 for internal management purposes (e.g., due to internal maintenance processes in solid-state memory and/or to add data redundancy for protection against localized system failures). In this case, therefore, after destaging of write data from cache 41, additional background writes are performed in main storage 56. Here, I/O controller 25 is adapted to calculate the total processing time $T_{pw}$ associated with servicing the write request to include the time taken to re-write data units corresponding to the write request in the main storage 56. For a given write request, the number of re-written data units (e.g., flash pages or other fundamental write-units for the storage technology in question) corresponding to a write request depends on the particular background processes and the file-size of the request.

For example, if data is re-written within storage 56 for redundancy purposes only, and with a redundancy factor f, then for X units of cached write data, the total number of data units written to storage 56 will be f X (initial destaging plus (f−1)X re-written units), subject to appropriate adjustment for any additional processing, such as data compression, data units added by ECC coding processes, etc., where employed. $T_{pw}$ can then account for time taken to write all these data units. Similarly, if background re-writes are performed for internal maintenance purposes (without redundancy), resulting in an average write amplification factor of W, then $T_{pw}$ can include time taken to write WX units (e.g., initial write of X units and time taken to re-write (W−1)X units, which can include time taken to read the (W−1)X units). This can be subject to appropriate adjustment for data compression, etc. Write amplification W may vary with operational state of a storage system and can be calculated periodically based on current system operating parameters. Write amplification, data compression, and redundancy factors may also vary for different user workloads, and this can be accommodated as described further below.

Figure 6:
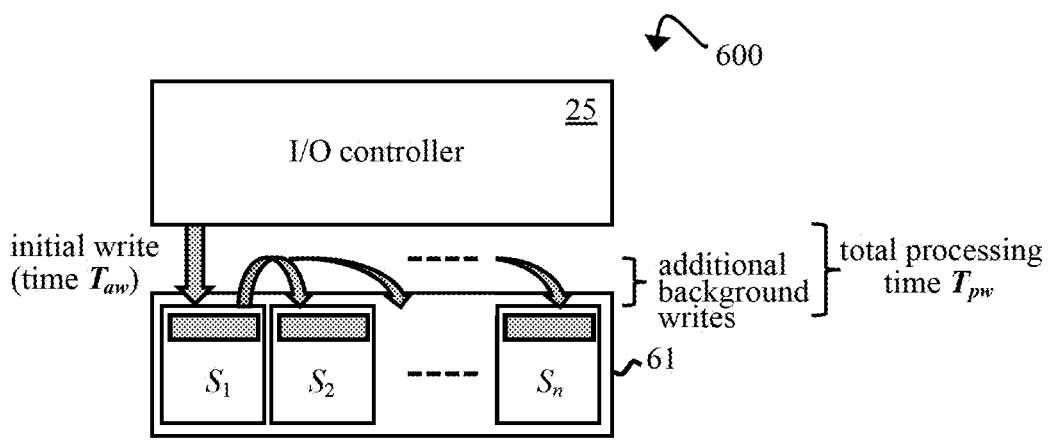
FIG. 6 is a schematic diagram illustrating a system in which write data is not cached, but data is re-written within a storage for internal management purposes, according to some embodiments of the present disclosure.

FIG. 6 is a schematic diagram illustrating a system 600 in which write data is not cached, but data is re-written within a storage 61 for internal management purposes, according to some embodiments of the present disclosure. For example, the data can be re-written within storage 61 to add redundancy. In this example, storage 61 can include n storage nodes, $S_1$ to $S_n$. Data can be written directly to one storage node, here $S_1$, and time for this write operation can determine the actual write time $T_{aw}$ for a write request. Additional data can then be written to the other storage nodes $S_2$ to $S_n$, and the total processing time $T_{pw}$ associated with servicing the write request is calculated to include time taken for these extra write operations. The additional data written to ensure redundancy can be one or multiple copies of the original data and may include parity metadata or error correction codes.

While basic system architectures are described above, a given storage system may employ one or a combination of such architectures. For example, different background processes may be performed in different storage components, and/or a given storage device may perform data re-writes for both internal maintenance and redundancy purposes. In each case, however, I/O controller 25 can calculate a total processing time $T_{pw}$ for servicing a write request $T_{pw}$ based on relevant operating parameters of the system. Such operating parameters may include cache destaging times, the number of data units that can be written in parallel to storage components, redundancy and/or write amplification factors, compression ratios, additional ECC data, etc., as appropriate for a given system. Factors such as write amplification which vary with operational state of a storage system can be calculated periodically based on current system parameters (e.g., using internally-logged statistics for numbers of logical data units received from users and physical data units written to storage).

By injecting latency into write requests as described above, I/O controller 25 creates time for background processes to catch up with user I/Os. This significantly reduces the likelihood that background processes will back up to a critical point at which all user I/Os need to be throttled up-front, with consequent disruption to user workloads. By injecting latency after write requests complete, controller 25 can target those requests that complete faster than their total servicing time in the system. This tightens the latency distribution for the system, reducing tail latencies without affecting overall system throughput.

Figure 7:
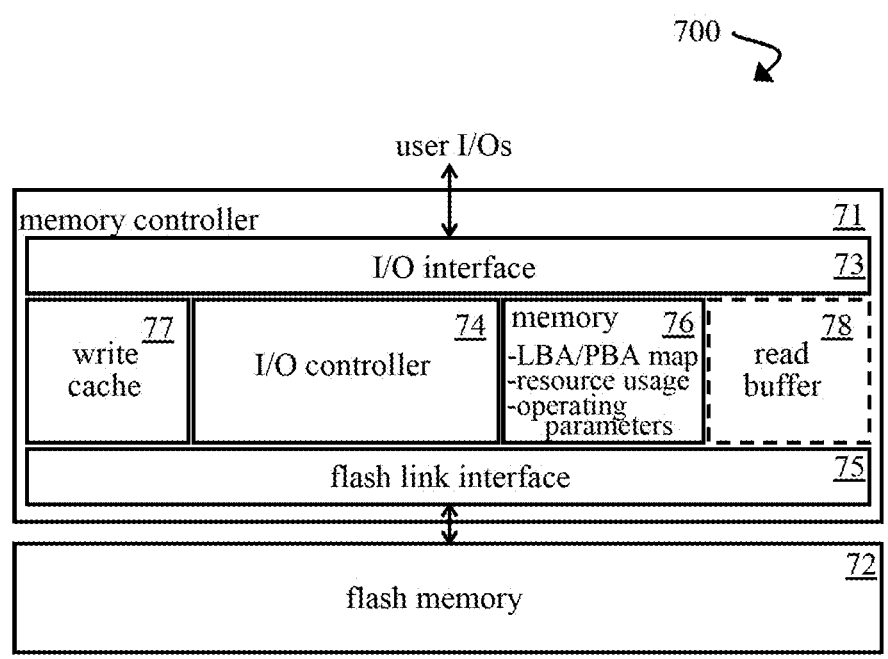
FIG. 7 is a block diagram illustrating components of a solid-state drive (SSD), according to some embodiments of the present disclosure.

FIG. 7 is a block diagram illustrating components of an SSD 700, according to some embodiments of the present disclosure. The SSD 700 includes a memory controller 71 and flash storage implemented here by NAND flash memory 72. Flash memory 72 may include one or more storage channels each providing a bank of flash storage dies on one or more chips/packages of chips, and may comprise SLC (single-level cell) dies, MLC (multi-level cell) dies or a combination thereof. Memory controller 71 includes an I/O interface 73, an I/O controller 74, a flash-link interface 75, and controller memory 76 for storing system metadata. A write cache 77 is provided for caching write data to be destaged to flash memory 72. In some embodiments, the SSD 700 may also include a read buffer 78, as indicated by dashed lines in FIG. 7, for buffering of data read from flash memory 72. Controller memory 76 and read buffer 78 may be implemented, for example, in DRAM or another other type of persistent memory, such as MRAM (Magnetoresistive RAM) or PCM (Phase-Change Memory). Write cache 77 may be implemented by non-volatile memory such as MRAM and PCM or by a battery-backed DRAM that ensures data persistency.

I/O controller 74 can control storage and retrieval of data in flash memory 72 and maintain an LBA/PBA map in controller memory 76, thereby mapping locations of logical (user) data blocks to physical block addresses in the flash. I/O controller 74 also monitors resource usage in the system, such as utilization levels in write cache 77 and the amount of free storage (e.g., RTU levels) in flash memory 72, and records these levels in memory 76. Various other operating parameters can be stored in memory 76 for use in the latency injection scheme as described below.

Figure 8:
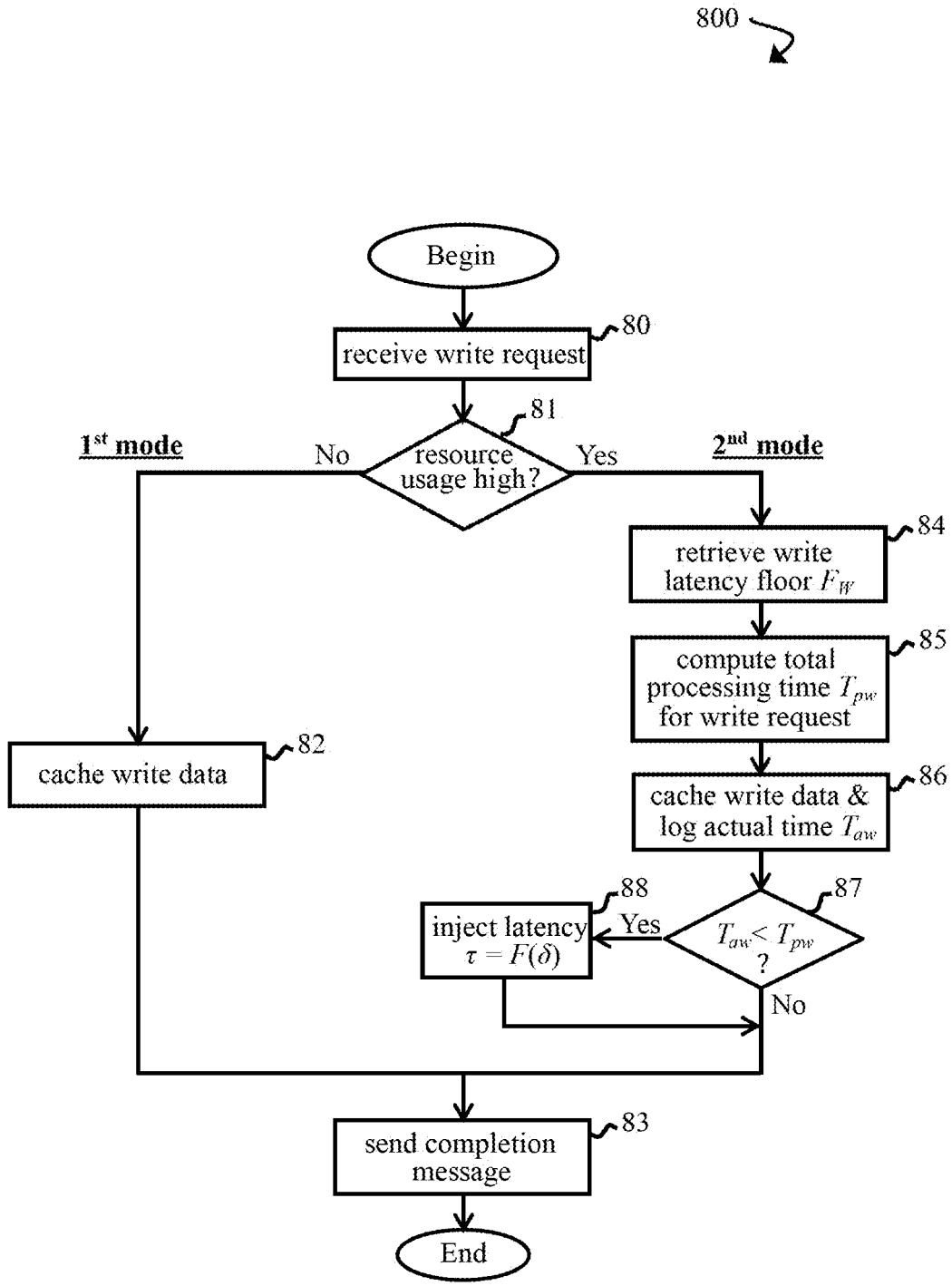
FIG. 8 is a flow diagram illustrating a latency injection process for write requests in the SSD, according to some embodiments of the present disclosure.

In some embodiments, I/O controller 74 can be selectively operable in one of two modes. FIG. 8 is a flow diagram illustrating a latency injection process 800 for write requests in the SSD 700, according to some embodiments of the present disclosure. Operation 80 represents receipt of a write request at I/O interface 73. At operation 81, the I/O controller 74 determines whether resource usage in the system satisfies a threshold condition signifying high resource usage levels. In this example, the threshold condition is satisfied if cache utilization exceeds a first threshold or if RTU levels drop below a second threshold. If the threshold condition is not satisfied at operation 81, then the write data is cached at operation 82 and the completion message is sent to the I/O interface immediately. This is illustrated at operation 83. Hence, the completion message is not delayed for this write request and no latency is injected.

However, if resource usage is deemed high at decision 81, then process 800 proceeds to operation 84. Here, I/O controller 74 retrieves a "latency floor" ($F_W$) for write operations, which is stored as an operating parameter in controller memory 76. This latency floor $F_W$ can be defined as the average cost (in terms of time) to perform all physical I/O in flash memory 72 associated with storing a single logical block write. The average cost includes all inline write I/Os and all I/O during background processes and is updated periodically as described below.

At operation 85, I/O controller 74 calculates the total processing time $T_{pw}$ for servicing the write request in the system. This calculation, explained in greater detail below, uses the current write latency floor $F_W$, a write amplification factor W, and I/O metadata such as the write-request file size and any applicable compression ratio R for the write request. The write amplification W and compression ratio R can be stored as operating parameters in controller memory 76. At operation 86, the write request can be stored in write cache 77, and I/O controller 74 can determine the actual time $T_{aw}$ taken to cache the write data.

At operation 87, I/O controller 74 determines whether this actual time $T_{aw}$ is less than the total processing time $T_{pw}$ calculated at operation 85 for the write request. If not, then operation proceeds to operation 83, and the completion message is sent immediately. No latency is therefore injected. However, if $T_{aw} < T_{pw}$ at operation 87, then, at operation 88, the controller injects latency $\tau$ before sending the completion message for the write request at operation 83. Here, the latency $\tau$ is function F of the difference $\delta$ between the total processing time $T_{pw}$ and the actual write time $T_{aw}$ for the write request, where $\tau$ is greater for larger $\delta$. In this embodiment, F=1 and so $\tau=\delta$, whereby completion of the write request is delayed by $(T_{pw}-T_{aw})$.

A calculation of the total processing time $T_{pw}$ at operation 85 is illustrated in the following example for an SSD 700 that has 10 flash devices connected over 10 lanes. Each flash device supports up to 4 parallel writes, thereby allowing up to 10×4=40 flash pages to be written in parallel to flash memory 72. If the average program write latency (e.g., average time to write a program unit of 40 flash pages) is 1 ms, a physical flash page can be destaged from write cache 77 and written to flash on average every 1000/40=25 μs. If the write amplification factor is W=4, then the latency floor $F_W$=4×25 μs=100 μs. For a 128 kB write request with compression ratio R=2, $T_{pw}$ can be calculated as $T_{pw}$=(128 kB/16 kB/2)×100 μs=400 μs for a flash page size of 16 kB. This corresponds to an initial write (destaging) time of (128 kB/16 kB/2)×25 μs=100 μs, plus a (128 kB/16 kB/2)×(4−1)×25 μs=300 μs cost of background re-writes due to garbage collection (here ignoring read latency, block erase latency, and all other background activities except garbage collection). Assuming the cache write takes $T_{aw}$=10 μs, then the latency $\tau$ injected at operation 88 is given by $\tau$=100 μs+300 μs−10 μs=390 μs.

FIG. 9 is a flow diagram illustrating a process 900 of monitoring system parameters stored in controller memory 76, according to some embodiments of the present disclosure. At operation 90, I/O controller 74 can retrieve the physical page-write statistics logged to flash memory 72 (e.g., the number of physical page writes completed in flash memory 72 for user data over the current operating period). At operation 92, I/O controller 74 can read the user page-write stats (logged in controller memory 76), which can be the number of logical page writes for the current operating period. At operation 94, the I/O controller 74 can retrieve the garbage collection (GC) stats from flash memory 72. The GC stats can be the number of flash pages rewritten due to garbage collection over the current period.

The ratio of (physical page-writes+GC page-writes) to logical page-writes gives the current write amplification factor W. While garbage collection is the predominant contributor to write-amplification, writes due to other background processes can be considered in some embodiments. For example, writes due to processes for dealing with read-disturb blocks, background error scrub, re-calibration of threshold voltage shift values, etc. can be considered, in which case statistics for these additional processes can also be retrieved at operation 94. In some embodiments, predicting the future number of physical pages to be relocated based on the amount of valid data in the flash blocks next in line for garbage collection might be preferable instead of using past garbage collection statistics. At operation 96, I/O controller 74 can then calculate the write latency floor $F_W$ for the current period and updates this value in memory 76. I/O controller 74 can then wait (operation 98) for the current operating period to expire, whereupon process 900 can revert to operation 90, and parameters can again be updated.

It will be seen that the above embodiment injects write latency dynamically as required based on resource usage in system 700, and the write latency floor can be adaptive to current operating state of the system. The latency injected can then be tailored to individual write requests, whereby requests which complete faster than their total estimated processing time are delayed by the appropriate amount.

In some embodiments, the disclosed techniques can avoid indiscriminately delaying all user I/Os, thereby exacerbating the tail of the latency distribution. For example, the disclosed techniques can differentiate between read and write components of user I/Os, injecting latency into write operations in proportion to their true cost. Since write bandwidth can impact read bandwidth, restricting write bandwidth when required can also improve read throughput and reduce read latency. The effect of the above technique on the SSD latency distribution is illustrated schematically in FIGS. 10A and 10B.

FIGS. 10A and 10B are charts 1000 and 1010 illustrating latency distributions, according to some embodiments of the present disclosure. FIG. 10A illustrates how the technique operates in relation to the initial latency distribution (without latency injection). FIG. 10B shows the transformation affected by the latency injection technique. In chart 1010, the long latency tail has been removed, and the distribution tightened, without affecting overall system throughput.

Figure 11:
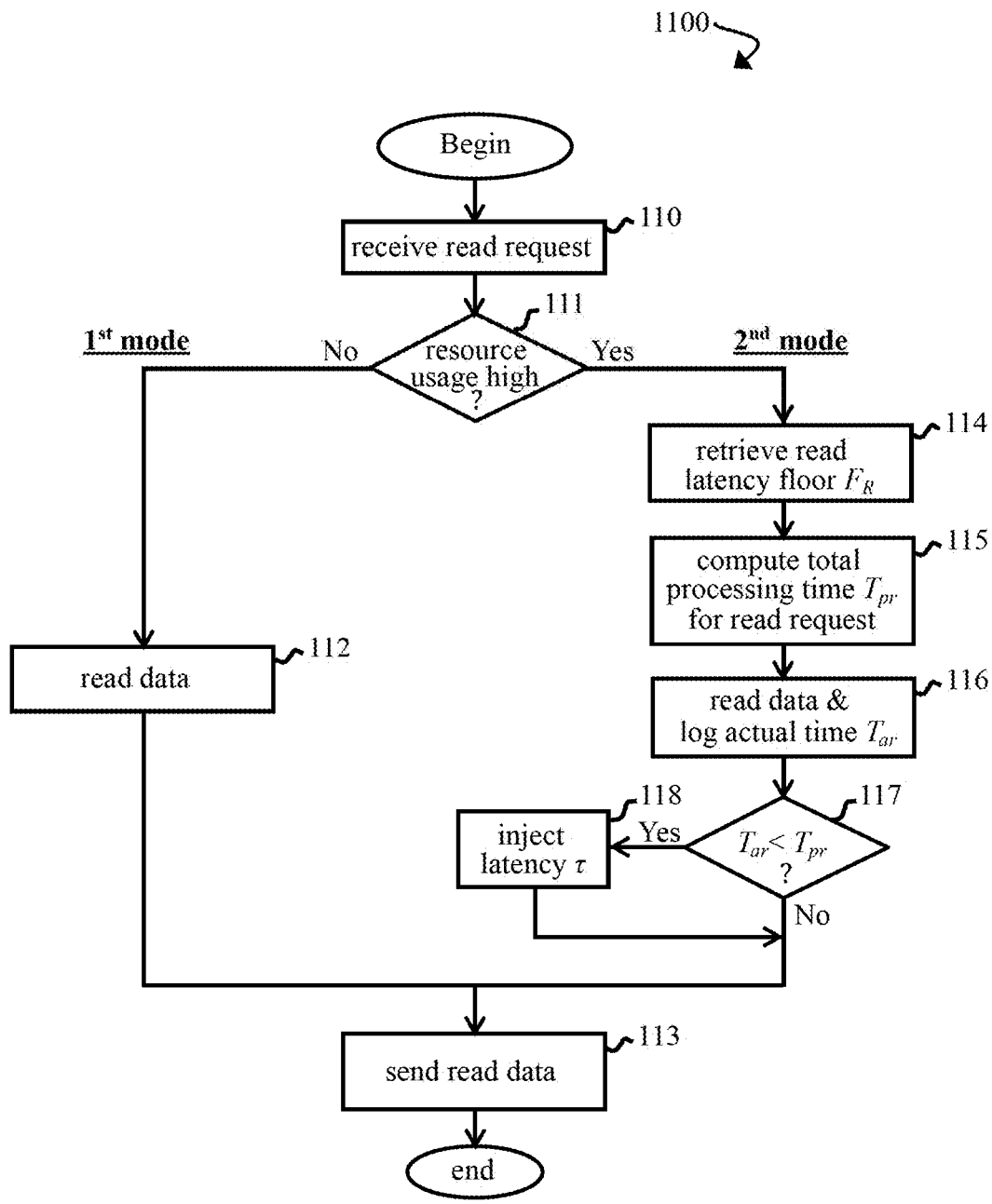
FIG. 11 is a flow diagram illustrating a process of read latency injection, according to some embodiments of the present disclosure.

While injecting latency into write requests has a significant effect on latency distributions, similar techniques may be applied to read requests in some embodiments. In particular, where data units are re-read within the system storage due to internal management processes (e.g., error checking, recalibration of threshold voltage shift values, etc.) or require periodic data refresh (e.g., due to read disturb or charge loss effects), the I/O controller 74 may delay completion of reads requests if the actual time taken to read data specified in a read request is less than a total processing time (including background processes) associated with servicing the read request in the system. The total processing time associated with servicing the read request then includes time taken by background processes to re-read data units corresponding to the read request in the system storage. FIG. 11 shows an implementation of this process in the SSD 700 of FIG. 7.

FIG. 11 is a flow diagram illustrating a process 1100 of read latency injection, according to some embodiments of the present disclosure. Operation 110 represents receipt of a read request at I/O interface 73 of SSD 700. At operation 111, I/O controller 74 determines whether resource usage in the system satisfies the threshold condition described above. If not, the required data is simply read at operation 112 and sent immediately to I/O interface 73 at operation 113. If the resource usage does satisfy the threshold condition, however, process 1100 proceeds to operation 114 where I/O controller 74 retrieves a latency floor, denoted by $F_R$, for read operations from controller memory 76. Like $F_W$, the read latency floor $F_R$ is defined as the average cost (in terms of time) associated with a physical page read, including associated background read processes, in flash memory 72. This can be calculated at operation 96 of monitoring process 900 (FIG. 9) based on physical and logical page read counts and background read statistics retrieved along with the write stats at operations 90 to 94.

At operation 115, the controller calculates the total processing time $T_{pr}$ for servicing the read request by multiplying the number of physical pages in the read request by the read latency floor $F_R$. At operation 117, the requested data is read from flash memory 72 and the actual read time $T_{ar}$ is determined. In decision operation 117, the controller then determines whether this actual time $T_{ar}$ is less than the total processing time $T_{pr}$ for the read request. If not, then operation proceeds to operation 113 and the read data is sent immediately. If $T_{ar}<T_{pr}$ at operation 117, then at operation 118 controller 74 injects latency by storing the read data, for a time $\tau$, in read buffer 78 before sending the data to I/O interface 73. As for write latency, the read latency $\tau$ may be a function of the difference $\delta$ between the total processing time $T_{pr}$ and the actual read $T_{ar}$ (e.g., $\tau=\delta$).

The embodiments described above can be adapted to support multi-tenancy and further improve quality-of-service by considering user workloads individually. Operating parameters can be defined for each of a plurality of storage regions in the system. I/O controller 74 can then calculate the total processing time $T_{pw}$ (and $T_{pr}$ for read latency injection) for servicing a write (or read) request based on the operating parameters for a storage region used for storing the data for that request. In SSD 700, for example, I/O controller 74 may assign different LBA ranges to different user workloads, and each LBA range may have its own set of parameters to describe the user workload and compute the read/write latency floors. Alternatively, or in addition, the controller may split the LBA space into a number of ranges (e.g., 100 GB ranges) where each range has its own set of parameters.

It will be appreciated that the techniques described above can complement existing methods of up-front latency injection, allowing latency to be injected more gradually based on whether ongoing I/O workloads are sustainable. This mitigates the need for upfront latency injection and the significant disruption to user workloads which result.

Various other changes and modifications can be made to the embodiments described above. By way of example, various other resource usage conditions may be used for switching between latency modes. For instance, some embodiments may switch write latency in and out based on cache utilization only. Various other functions may be also be envisaged for calculating the latency $\tau$ and/or the read/write latency floors. For example, $\tau$ could be a monotonically increasing function of the aforementioned difference $\delta$ subject to a minimum latency applied to all requests for which $T_{aw}<T_{pw}$.

In general, where features are described herein with reference to control apparatus, corresponding features may be provided in a storage system employing such apparatus, and in a latency control method embodying the disclosure. Operations of flow diagrams may be performed in a different order to that shown and some operations may be performed in parallel as appropriate.

Figure 12:
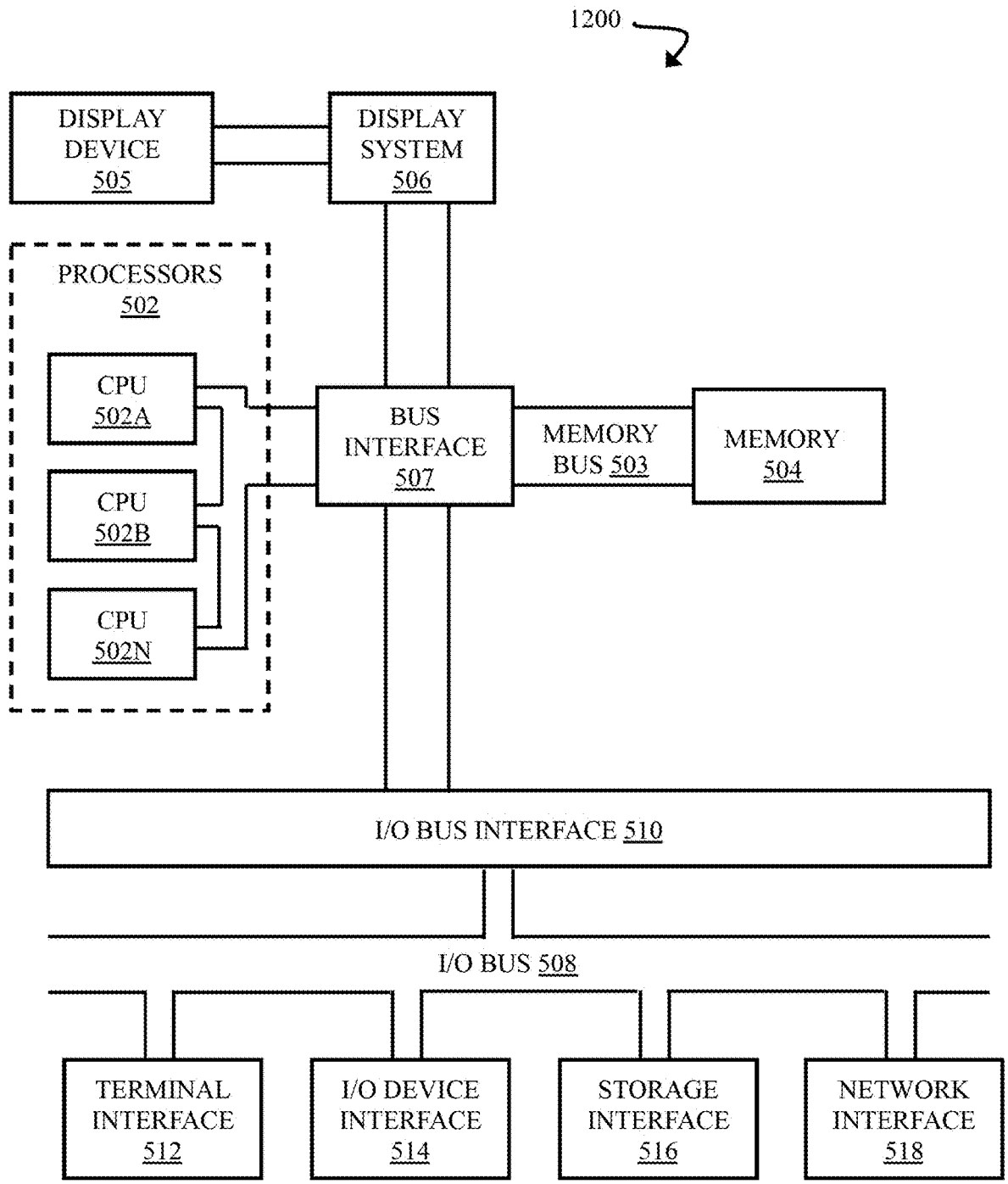
FIG. 12 is a block diagram illustrating a computer system, according to some embodiments of the present disclosure.

FIG. 12 is a block diagram illustrating an exemplary computer system 1200 that can be used in implementing one or more of the methods, tools, components, and any related functions described herein (e.g., using one or more processor circuits or computer processors of the computer). In some embodiments, the major components of the computer system 1200 comprise one or more processors 502, a memory subsystem 504, a terminal interface 512, a storage interface 516, an input/output device interface 514, and a network interface 518, all of which can be communicatively coupled, directly or indirectly, for inter-component communication via a memory bus 503, an input/output bus 508, bus interface unit 507, and an input/output bus interface unit 510.

The computer system 1200 contains one or more general-purpose programmable central processing units (CPUs) 502A, 502B, and 502-N, herein collectively referred to as the CPU 502. In some embodiments, the computer system 1200 contains multiple processors typical of a relatively large system; however, in other embodiments the computer system 1200 can alternatively be a single CPU system. Each CPU 502 may execute instructions stored in the memory subsystem 504 and can include one or more levels of on-board cache.

The memory 504 can include a random-access semiconductor memory, storage device, or storage medium (either volatile or non-volatile) for storing or encoding data and programs. In some embodiments, the memory 504 represents the entire virtual memory of the computer system 1200 and may also include the virtual memory of other computer systems coupled to the computer system 1200 or connected via a network. The memory 504 is conceptually a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

Components of systems illustrated herein (e.g., systems 200 and/or 400-700) can be included within the memory 504 in the computer system 1200. However, in other embodiments, some or all of these components may be on different computer systems and may be accessed remotely (e.g., via a network). The computer system 1200 may use virtual addressing mechanisms that allow the programs of the computer system 1200 to behave as if they only have access to a large, single storage entity instead of access to multiple, smaller storage entities. Thus, components of the memory 504 are not necessarily all completely contained in the same storage device at the same time. Further, although these components are illustrated as being separate entities, in other embodiments some of these components, portions of some of these components, or all of these components may be packaged together.

In an embodiment, components of systems 200 and 400-700 include instructions that execute on the processor 502 or instructions that are interpreted by instructions that execute on the processor 502 to carry out the functions as further described in this disclosure. In another embodiment, the components of systems 200 and 400-700 are implemented in hardware via semiconductor devices, chips, logical gates, circuits, circuit cards, and/or other physical hardware devices in lieu of, or in addition to, a processor-based system. In another embodiment, the components of systems 200 and 400-700 include data in addition to instructions.

Although the memory bus 503 is shown in FIG. 12 as a single bus structure providing a direct communication path among the CPUs 502, the memory subsystem 504, the display system 506, the bus interface 507, and the input/output bus interface 510, the memory bus 503 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 510 and the input/output bus 508 are shown as single respective units, the computer system 1200 may, in some embodiments, contain multiple input/output bus interface units 510, multiple input/output buses 508, or both. Further, while multiple input/output interface units are shown, which separate the input/output bus 508 from various communications paths running to the various input/output devices, in other embodiments some or all of the input/output devices may be connected directly to one or more system input/output buses.

The computer system 1200 may include a bus interface unit 507 to handle communications among the processor 502, the memory 504, a display system 506, and the input/output bus interface unit 510. The input/output bus interface unit 510 may be coupled with the input/output bus 508 for transferring data to and from the various input/output units. The input/output bus interface unit 510 communicates with multiple input/output interface units 512, 514, 516, and 518, which are also known as input/output processors (IOPs) or input/output adapters (IOAs), through the input/output bus 508. The display system 506 may include a display controller. The display controller may provide visual, audio, or both types of data to a display device 505. The display system 506 may be coupled with a display device 505, such as a standalone display screen, computer monitor, television, or a tablet or handheld device display. In alternate embodiments, one or more of the functions provided by the display system 506 may be on board a processor 502 integrated circuit. In addition, one or more of the functions provided by the bus interface unit 507 may be on board a processor 502 integrated circuit.

In some embodiments, the computer system 1200 is a multi-user mainframe computer system, a single-user system, or a server computer or similar device that has little or no direct user interface but receives requests from other computer systems (clients). Further, in some embodiments, the computer system 1200 is implemented as a desktop computer, portable computer, laptop or notebook computer, tablet computer, pocket computer, telephone, smart phone, network switches or routers, or any other appropriate type of electronic device.

It is noted that FIG. 12 is intended to depict the representative major components of an exemplary computer system 1200. In some embodiments, however, individual components may have greater or lesser complexity than as represented in FIG. 12, Components other than or in addition to those shown in FIG. 12 may be present, and the number, type, and configuration of such components may vary.

In some embodiments, the data storage and retrieval processes described herein could be implemented in a cloud computing environment, which is described below with respect to FIGS. 13 and 14. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
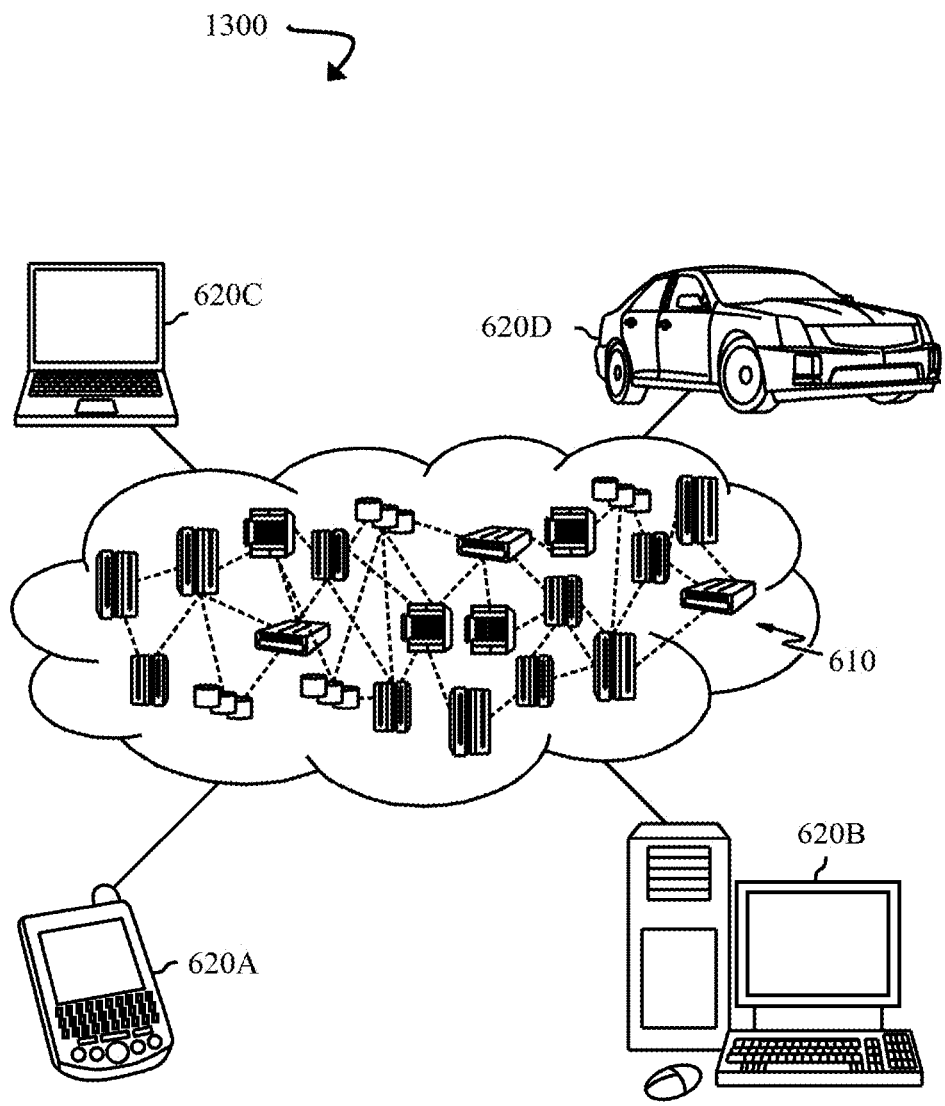
FIG. 13 is a block diagram illustrating a cloud computing environment, according to some embodiments of the present disclosure.

FIG. 13 is a block diagram illustrating a cloud computing environment 1300, according to some embodiments of the present disclosure. As shown, cloud computing environment 1300 includes one or more cloud computing nodes 610 with which local computing devices used by cloud consumers, such as, for example, personal digital assistant (PDA) or cellular telephone 620A, desktop computer 620B, laptop computer 620C, and/or automobile computer system 620D may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 620A—620D shown in FIG. 4 are intended to be illustrative only and that computing nodes 610 and cloud computing environment 1300 can communicate with any type of computerized device over any type of network and/or network addressable connection (e.g., using a web browser).

Figure 14:
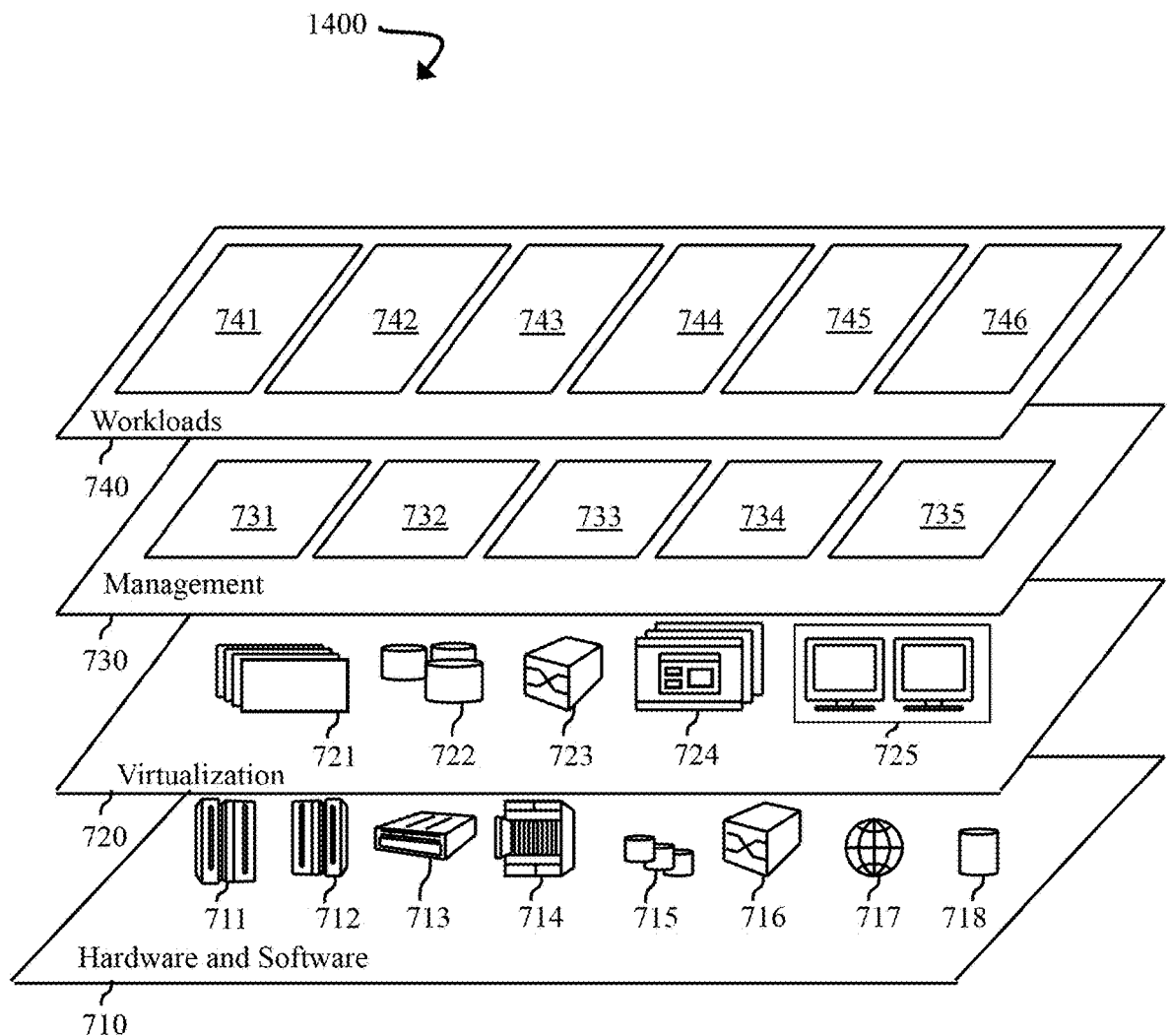
FIG. 14 is a block diagram illustrating a set of functional abstraction model layers provided by the cloud computing environment, according to some embodiments of the present disclosure.

FIG. 14 is a block diagram illustrating a set of functional abstraction model layers 1400 provided by the cloud computing environment 1300, according to some embodiments of the present disclosure. It should be understood in advance that the components, layers, and functions shown in FIG. 7 are intended to be illustrative only and embodiments of the disclosure are not limited thereto. As depicted, the following layers and corresponding functions are provided:

Hardware and software layer 710 includes hardware and software components. Examples of hardware components include: mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 provides the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment can be utilized. Examples of workloads and functions that can be provided from this layer include: mapping and navigation 741; software development and lifecycle management 742; virtual classroom education delivery 743; data analytics processing 744; transaction processing 745; and latency injection 746.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
receiving a write request to a system;
calculating, based on operating parameters of the system, a total processing time associated with servicing the write request in the system;
determining an actual time taken to store data specified in the write request;
in response to determining that the actual time is less than the total processing time, delaying sending a completion message for the write request to an I/O interface;
monitoring resource usage of the system;
receiving another write request to the system; and
selecting, based on the resource usage, a first mode or a second mode, wherein:
in the first mode, a completion message for the another write request is not delayed;
in the second mode, the completion message for the another write request is delayed when an actual time taken to store data associated with the another write request is less than a total processing time calculated for the another write request; and
the second mode is selected if the resource usage satisfies a threshold condition.

2. The method of claim 1, wherein the delaying sending the completion message comprises delaying by a time $\tau$ dependent on the difference $\delta$ between the total processing time and the actual time, and wherein the time $\tau$ is greater when the difference $\delta$ is larger.

3. The method of claim 2, wherein the time $\tau$ is equal to the difference $\delta$.

4. The method of claim 1, wherein the system comprises a cache and a main storage, and wherein:
the storing the data specified in the write request comprises storing the data in the cache for destaging to the main storage;
the actual time taken to store the data comprises the time taken to store the data in the cache; and
the total processing time comprises the time taken to destage the data to the main storage.

5. The method of claim 4, wherein data units are re-written within the main storage for internal management thereof, wherein the total processing time includes time taken to re-write data units corresponding to the write request in the main storage.

6. The method of claim 5, wherein the main storage comprises flash memory, and wherein the method further comprises:
monitoring utilization of the cache;
receiving another write request; and
selecting, based on the utilization of the cache, the first mode or the second mode, wherein:
the second mode is selected if the utilization of the cache exceeds a threshold utilization.

7. The method of claim 6, further comprising, in the first mode:
monitoring an amount of free flash blocks in the flash memory;
determining that the amount is below a threshold amount; and
in response to the determining, switching from the first mode to the second mode.

8. The method of claim 1, wherein the system comprises a storage in which data units are re-written for internal management thereof, and wherein the total processing time includes time taken to re-write data units corresponding to the write request in the storage.

9. The method of claim 1, wherein the system comprises a cache and a main storage, and wherein the method further comprises, in the first mode:
monitoring utilization of the cache;
determining that the utilization exceeds a threshold level; and
in response to the determining, switching from the first mode to the second mode.

10. The method of claim 1, wherein the system comprises a storage in which data units are re-written for internal management thereof, and wherein, in the first mode, the method further comprises:
- monitoring an amount of free storage in the system;
- determining that the amount is below a threshold amount of free storage; and
- in response to the determining, switching from the first mode to the second mode.

11. The method of claim 1, wherein operating parameters are defined for each of a plurality of storage regions in the system, and wherein the operating parameters on which the calculating the total processing time is based are operating parameters for a storage region used for storing the data specified in the write request.

12. The method of claim 1, wherein the system comprises a storage in which data units are re-read for internal management thereof, and wherein the method further comprises:
- receiving a read request to the system;
- calculating, based on the operating parameters of the system, a total processing time associated with servicing the read request in the system;
- determining an actual time taken to read data specified in the read request;
- in response to determining that the actual time is less than the total processing time for the read request, delaying sending the data specified in the read request to the I/O interface; and
- calculating a total processing time associated with servicing the read request that includes time taken to re-read data units corresponding to the read request.

13. A system, comprising:
a memory; and
a processor communicatively coupled to the memory, wherein the processor is configured to perform a method comprising:
- receiving a write request to the system;
- calculating, based on operating parameters of the system, a total processing time associated with servicing the write request in the system;
- determining an actual time taken to store data specified in the write request;
- in response to determining that the actual time is less than the total processing time, delaying sending a completion message for the write request to an I/O interface;
- monitoring resource usage of the system;
- receiving another write request to the system; and
- selecting, based on the resource usage, a first mode or a second mode, wherein:
  - in the first mode, a completion message for the another write request is not delayed;
  - in the second mode, the completion message for the another write request is delayed when an actual time taken to store data associated with the another write request is less than a total processing time calculated for the another write request; and
  - the second mode is selected if the resource usage satisfies a threshold condition.

14. The system of claim 13, wherein the delaying sending the completion message comprises delaying by a time $\tau$ dependent on the difference $\delta$ between the total processing time and the actual time, and wherein the time $\tau$ is greater when the difference $\delta$ is larger.

15. The system of claim 14, wherein the time $\tau$ is equal to the difference $\delta$.

16. The system of claim 13, wherein the system comprises a cache and a main storage, and wherein:
- the storing the data specified in the write request comprises storing the data in the cache for destaging to the main storage;
- the actual time taken to store the data comprises time taken to store the data in the cache; and
- the total processing time comprises time taken to destage the data to the main storage.

17. The system of claim 13, wherein the system comprises a storage in which data units are re-written for internal management thereof, and wherein the total processing time includes time taken to re-write data units corresponding to the write request in the storage.

18. The system of claim 13, wherein the system comprises a cache and a flash memory, and wherein:
- data units are re-written in the flash memory for internal management thereof;
- the storing the data specified in the write request comprises storing the data in the cache for destaging to the flash memory;
- the actual time taken to store the data comprises time taken to store the data in the cache;
- the total processing time comprises time taken to destage the data to the flash memory and time taken to re-write data units corresponding to the write request in the flash memory.

19. A computer program product, the computer program product comprising a computer readable storage medium having program instructions embodied therewith, the program instructions executable by a processor to cause a device to perform a method, the method comprising:
- receiving a write request to a system;
- calculating, based on operating parameters of the system, a total processing time associated with servicing the write request in the system;
- determining an actual time taken to store data specified in the write request;
- in response to determining that the actual time is less than the total processing time, delaying sending a completion message for the write request to an I/O interface;
- monitoring resource usage of the system;
- receiving another write request to the system; and
- selecting, based on the resource usage, a first mode or a second mode, wherein:
  - in the first mode, a completion message for the another write request is not delayed;
  - in the second mode, the completion message for the another write request is delayed when an actual time taken to store data associated with the another write request is less than a total processing time calculated for the another write request; and
  - the second mode is selected if the resource usage satisfies a threshold condition.

* * * * *